(12) United States Patent
Moreh et al.

(10) Patent No.: US 7,783,044 B2
(45) Date of Patent: Aug. 24, 2010

(54) SYSTEM FOR ON-LINE AND OFF-LINE DECRYPTION

(75) Inventors: Jahanshah Moreh, Los Angeles, CA (US); Logan O'Sullivan Bruns, Napa, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 2096 days.

(21) Appl. No.: 10/250,004

(22) Filed: May 27, 2003

(65) Prior Publication Data

US 2004/0165727 A1 Aug. 26, 2004

Related U.S. Application Data

(60) Provisional application No. 60/449,068, filed on Feb. 20, 2003.

(51) Int. Cl.
H04L 9/08 (2006.01)
H04L 9/00 (2006.01)
H04L 9/30 (2006.01)

(52) U.S. Cl. .......... 380/278; 380/277; 380/30; 380/279; 713/171; 713/176; 713/168; 713/152; 709/229; 709/206; 705/75

(58) Field of Classification Search .......... None
See application file for complete search history.

(56) References Cited

U.S. PATENT DOCUMENTS 6,009,173 A * 12/1999 Sumner .......... 713/156
6,011,849 A * 1/2000 Orrin .......... 380/42
6,160,891 A * 12/2000 Al-Salqan .......... 380/286
6,247,127 B1 * 6/2001 Vandergeest .......... 713/100
6,581,162 B1 * 6/2003 Angelo et al. .......... 713/193
6,584,564 B2 * 6/2003 Olkin et al. .......... 713/152
7,231,049 B2 * 6/2007 Kawaguchi et al. .......... 380/277
7,363,495 B2 * 4/2008 Felt et al. .......... 713/170
7,499,716 B2 * 3/2009 Helferich .......... 455/458
7,693,285 B2 * 4/2010 Curry .......... 380/281
2003/0182246 A1 * 9/2003 Johnson et al. .......... 705/76

* cited by examiner

*Primary Examiner*—Syed A. Zia
(74) *Attorney, Agent, or Firm*—Patent Venture Group; Raymond E. Roberts (57) ABSTRACT

A secure communication system wherein message decryption may be performed while off-line, or optionally while on-line. A sender encrypts a message based on the message key and sends it to the recipient. An envelope containing a message key is created by encrypting the message key based on a verifier, where the verifier is based on a secret of the recipient. The recipient is provided the envelope, along with the message or separately, from the sender or from another party, contemporaneous with receipt of the message or otherwise. The recipient can then open the envelope while off-line, based on their secret, and retrieve the message key from the envelope to decrypt the message. In the event the recipient cannot open the envelope, optional on-line access permits obtaining assistance that may include obtaining an alternate envelope that the recipient can open.

32 Claims, 7 Drawing Sheets

SYSTEM FOR ON-LINE AND OFF-LINE DECRYPTION

CROSS REFERENCE TO RELATED APPLICATIONS

This application claims the benefit of U.S. Provisional Application No. 60/449,068, filed Feb. 20, 2003.

BACKGROUND OF INVENTION

1. Technical Field

The present invention relates generally to secure electronic communication and more particularly to encryption and decryption of e-mail and other messages, files or other information.

2. Background Art

A key server may be used for managing and distributing symmetric encryption keys, that is, keys for an encryption system in which the encryption key and the decryption key for a particular message are the same. For example, in a secure e-mail system, a sender of an e-mail may request that the key server create and store a message key, that is, an encryption/decryption key for a message that is unique to that particular message or unique for a particular series of messages. The sender then encrypts the e-mail with the message key and sends it to the recipients. A given recipient then requests the message key from the key server, which determines the authenticity of the recipient. If the recipient is authentic and is also authorized to receive the message key (as specified by the original sender), the key server delivers the message key to the recipient, which uses the message key to decrypt the e-mail.

Distributing symmetric keys via a key server has many positive attributes. For example, a sender (or any authorized party) can determine when a recipient has requested and received the message key. This "key advisement" can form the basis of an audit system. Also, a sender (or any authorized party) can control access to the message key, including specifying not-before and not-after delivery times for a key. In this way, the message key can be made available only during a certain time window, or access can be terminated if conditions warrant denying any further access to the message.

Most present key server schemes make off-line decryption impossible because they require that the recipients be on line to communicate with the key server. There are some exceptions to this, however, and these off-line decryption systems generally use key enveloping via one of the following schemes. First, a sender can encrypt a message with a message key that is chosen at random. The message key is then encrypted (i.e., enveloped) with another key that is derived from a password known to the sender and all of the recipients. Second, as above, except that the message key is encrypted with a public key of the recipient. In either case, there is typically one envelope per recipient, particularly in the second scheme where each recipient's public key is different.

The first scheme above is weak. Enveloping a message key with another key that is derived from a password is susceptible to off-line dictionary attacks on the password. Given that most passwords need to be memorized by human users, and given that passwords must consist of printable characters, the effective length of a key derived from a password is anywhere from 1.5 to 5 bits per character. Thus, the effective length of a key derived from a twelve character password (which has 50% more characters than a typical password of eight characters) is anywhere from 18 to 60 bits. By today's standards, such a key is very weak and is subject to brute force attacks.

In summary, a key derived from a password is subject to both off-line dictionary attacks as well as brute force attacks.

The second scheme above is very strong. However, enveloping a message key with the recipient's public key imposes burdensome requirements. For example, all intended recipients must already have a public key, and those must be available to the sender at the time of enveloping. In cases where the sender and recipients are new to each other, simply ascertaining public keys can be an obstacle. Setting up, by obtaining public and private keys and such, can also be daunting when a recipient is new to the scheme. Not surprisingly, many potential recipients opt out if any other options exist, even less secure ones, and many resist adoption until they expect to receive substantial numbers of messages secured in this manner. Furthermore, the private key of each recipient must be available at the place where that recipient desires to read the message. For instance, if a recipient stores his private key at a computer at work, he would not be able to decrypt the message at a home computer that does not also have a copy of the recipient's private key.

In summary, a password-based scheme is easy to use but offers weak security. A public key scheme offers strong security but is very difficult to deploy and use. Because of the reasons mentioned above, the current state-of-the-art off-line decryption systems do not simultaneously satisfy both security and ease-of-use requirements.

SUMMARY OF INVENTION

Accordingly, it is an object of the present invention to provide a secure communication system that can simultaneously satisfy requirements of high security and high ease of use.

Briefly, one preferred embodiment of the present invention is a system for secure communication of a message from a sender to a recipient. An envelope is created containing a message key, by encrypting the message key based on a verifier that is based on a secret of the recipient. The message key is provided to the sender, where the message is encrypted based on the message key. The message is sent from the sender to the recipient. The envelope is also provided to the recipient, typically but not necessarily along with the message. The recipient then opens the envelope. This is done based on the secret of the recipient, and the recipient is then able to retrieve the message key from the envelope and decrypt the message based on the message key.

Briefly, another preferred embodiment of the present invention is a system for a sender to encrypt a message intended for a recipient. A message key is provided. Then an envelope is created containing the message key, by encrypting the message key based on a verifier that is based on a secret of the recipient. The message is encrypted, based on the message key. This then permits the message to be sent securely from the sender to the recipient and, when the recipient is provided with the envelope, typically but not necessarily along with the message, the secret can be used to open the envelope to retrieve the message key and decrypt the message.

Briefly, one preferred embodiment of the present invention is a system for secure communication of a message from a sender to a recipient. An envelope is created containing a message key, by encrypting the message key based on a verifier that is based on a secret of the recipient. The message key is provided to the sender, where the message is encrypted based on the message key. The message is sent from the sender to the recipient. The envelope is also provided to the recipient, typically but not necessarily along with the message. The recipient then opens the envelope. This is done based on the secret of the recipient, and the recipient is then able to retrieve the message key from the envelope and decrypt the message based on the message key.

An advantage of the present invention is that it provides both high security and high ease of use. With respect to improved security, the present invention uses encryption of message keys (enveloping) based on a verifier, rather than relying upon an envelope key derived directly from a password and the inherent weakness such introduces. With respect to improved ease of use, the present invention uses such enveloping and decryption (de-enveloping or envelope opening) to access the message key based on a corresponding secret, rather than a more complex scheme like public key infrastructure (PKI).

And another advantage of the invention is that embodiments of the invention optionally employ a mixture of on-line and off-line decryption capabilities, further combining high security high flexible utility.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended figures of drawings in which.

In the various figures of the drawings, like references are used to denote like or similar elements or steps.

DETAILED DESCRIPTION

A preferred embodiment of the present invention is a system for on-and off-line decryption in the greater context of a secure communication system. As illustrated in the various drawings herein, and particularly in the view of FIG. 3, a preferred embodiment of the invention is depicted by the general reference characters 130.

TERMINOLOGY

Unless stated otherwise, the following terminology is used herein.

Message key, encryption key, decryption key, or simply the key mean the symmetric key that is used to encrypt or decrypt a message.

Message means the unit of data that is encrypted and decrypted. Throughout this document we use e-mail as an example of a message. However, other kinds of messages are also envisioned. These include instant messages, chat messages, messages communicated between two applications using a protocol other than e-mail (SMTP) and manners of transferring files other than as e-mail attachments (e.g., FTP), etc.

Sender means the encryptor of the message.

Recipient, sometimes called receiver, means the decryptor of the message. The list of recipients can include the sender, or even be solely the sender. This is the case when a person encrypts a message for secure communication or storage so that only he or she can decrypt it later.

Envelop key means the symmetric key that encrypts/decrypts the message key, wherein an envelop encryption key is the public key that encrypts the message key and an envelop decryption key is the private or secret key that decrypts the message key.

Key exchange algorithm means the algorithm a sender and the recipients use to derive the envelop key.

Key encryption algorithm means the algorithm the sender and recipients use to encrypt or decrypt the envelop key.

Session key means an encryption/decryption key that is used to secure on-line communication between various components of the system. Session keys are preferably temporary and not stored on any server.

A Background Art on Line Encryption/Decryption System

Figure 1:
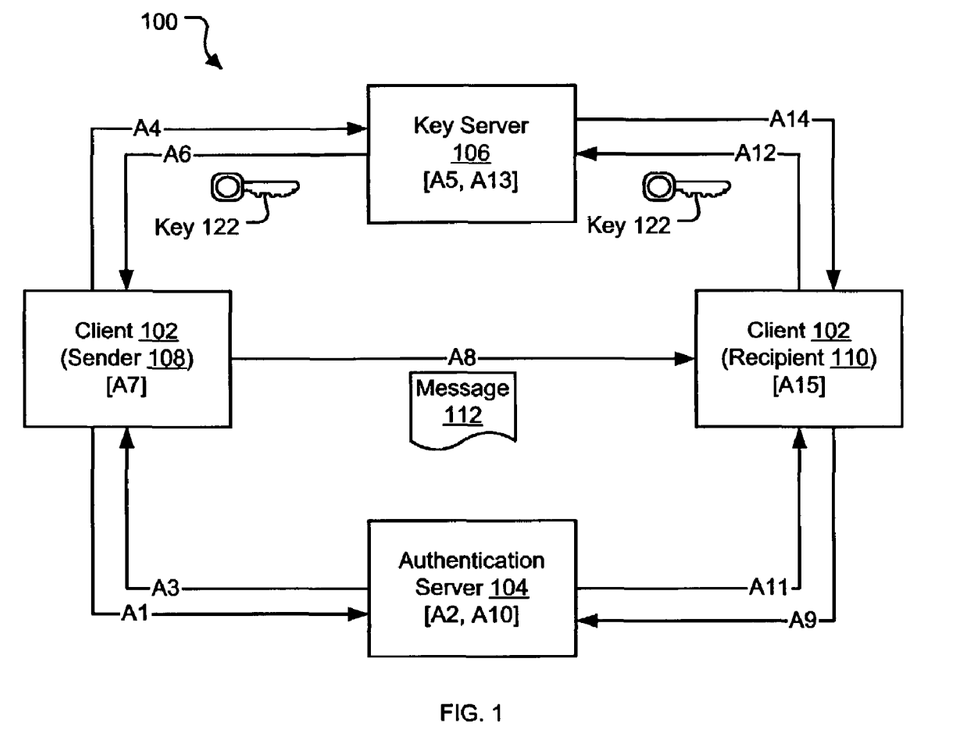
FIG. 1 (background art) is a functional block diagram of an on-line secure communication system.

FIG. 1 (background art) is a functional block diagram of a secure communication system 100 that the present invention improves upon. The secure communication system 100 here consists of three major components: clients 102, an authentication server 104, and a key server 106. The clients 102 are conceptually viewed as one component because senders 108 and recipients 110 collectively are both "clients" of the authentication server 104 and key server 106. All interactions between the clients 102 (that is, either a sender 108 or a recipient 110) and the authentication server 104 or the key server 106 may be encrypted using short-lived session keys.

Figure 2A:
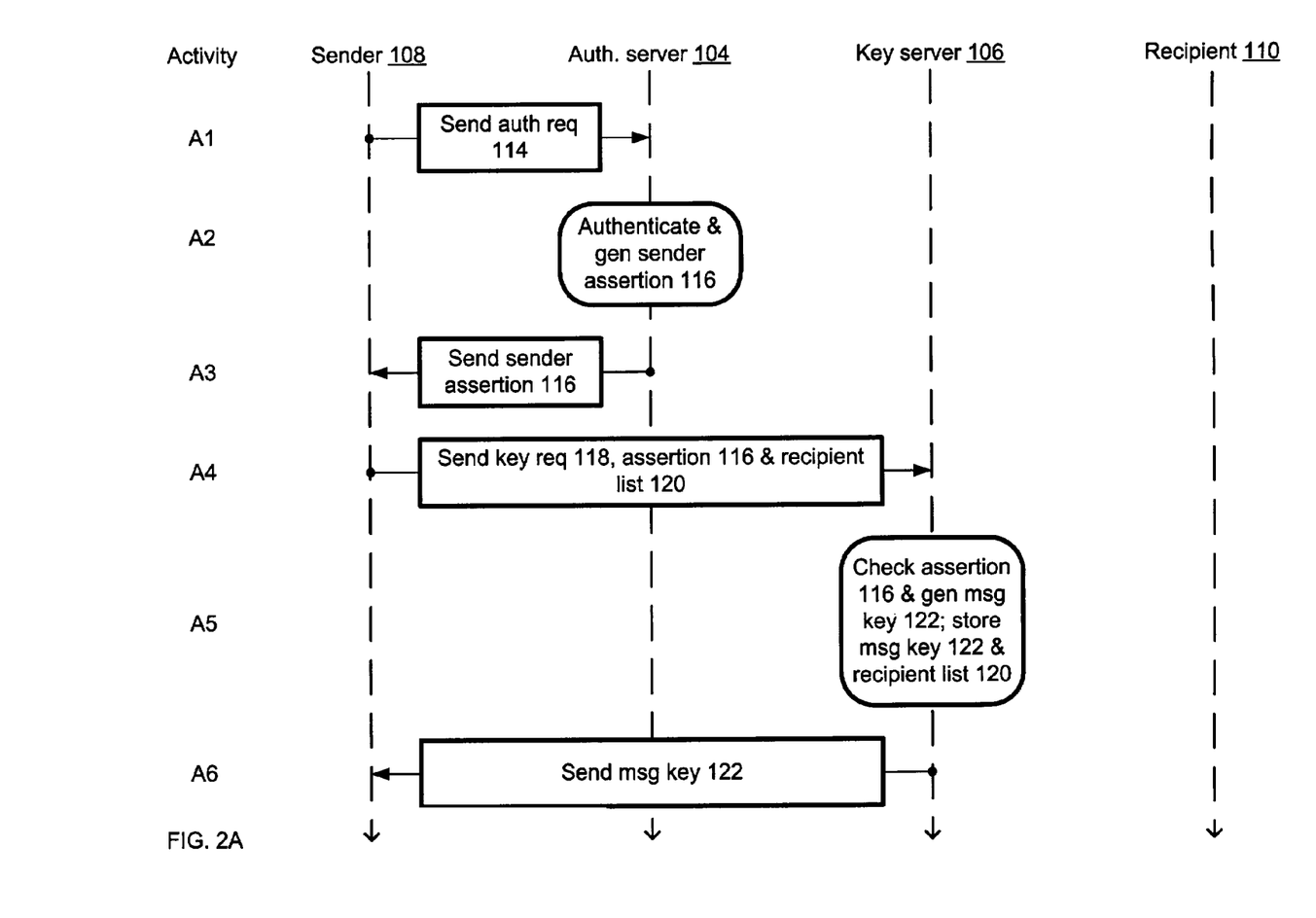
FIGS. 2A-C (background art)(extending across three sheets) is a network data flow diagram of an example message encryption, sending, and decryption that occurs within the secure communication system of FIG. 1.
Figure 2B:
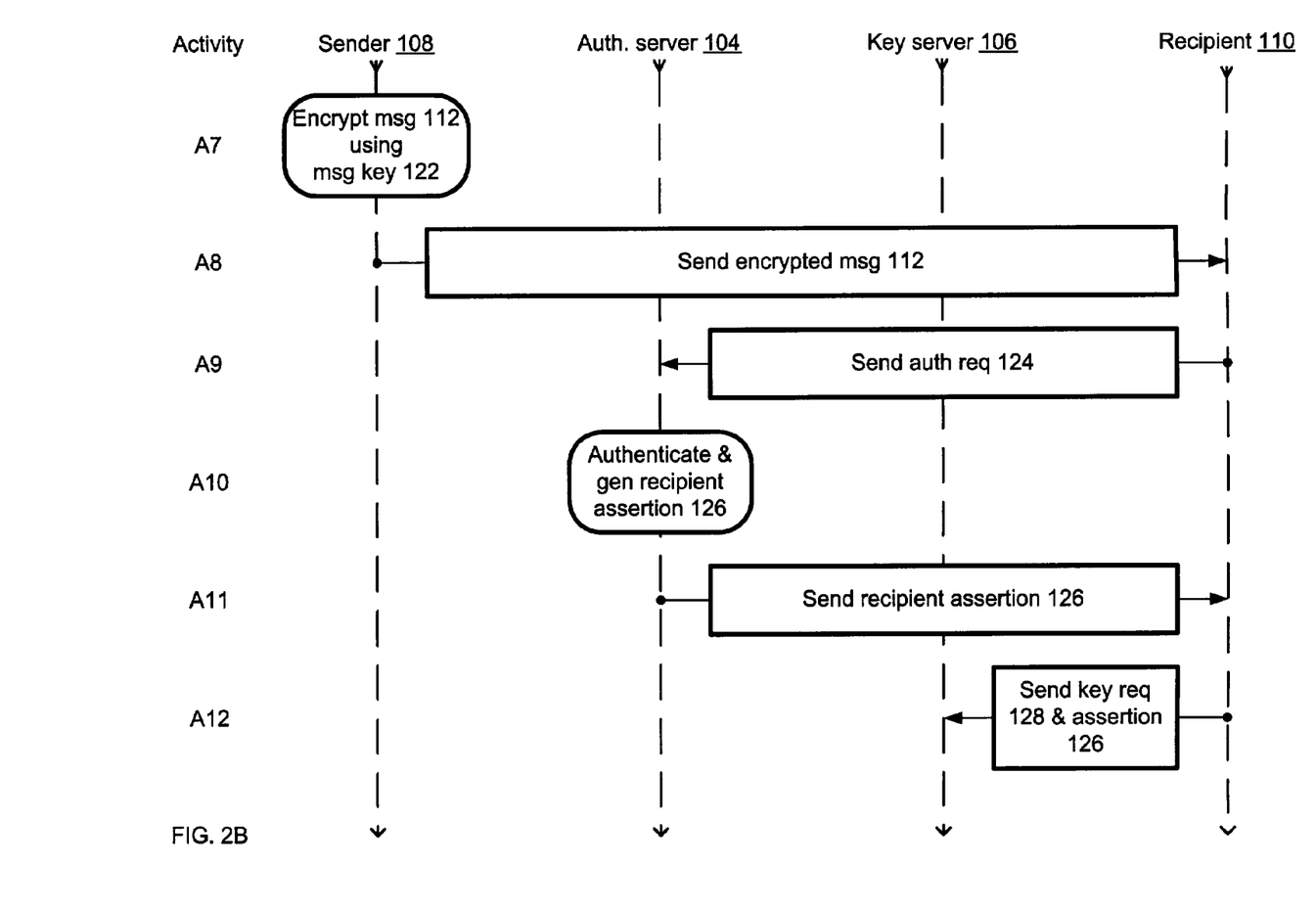
Figure 2C:
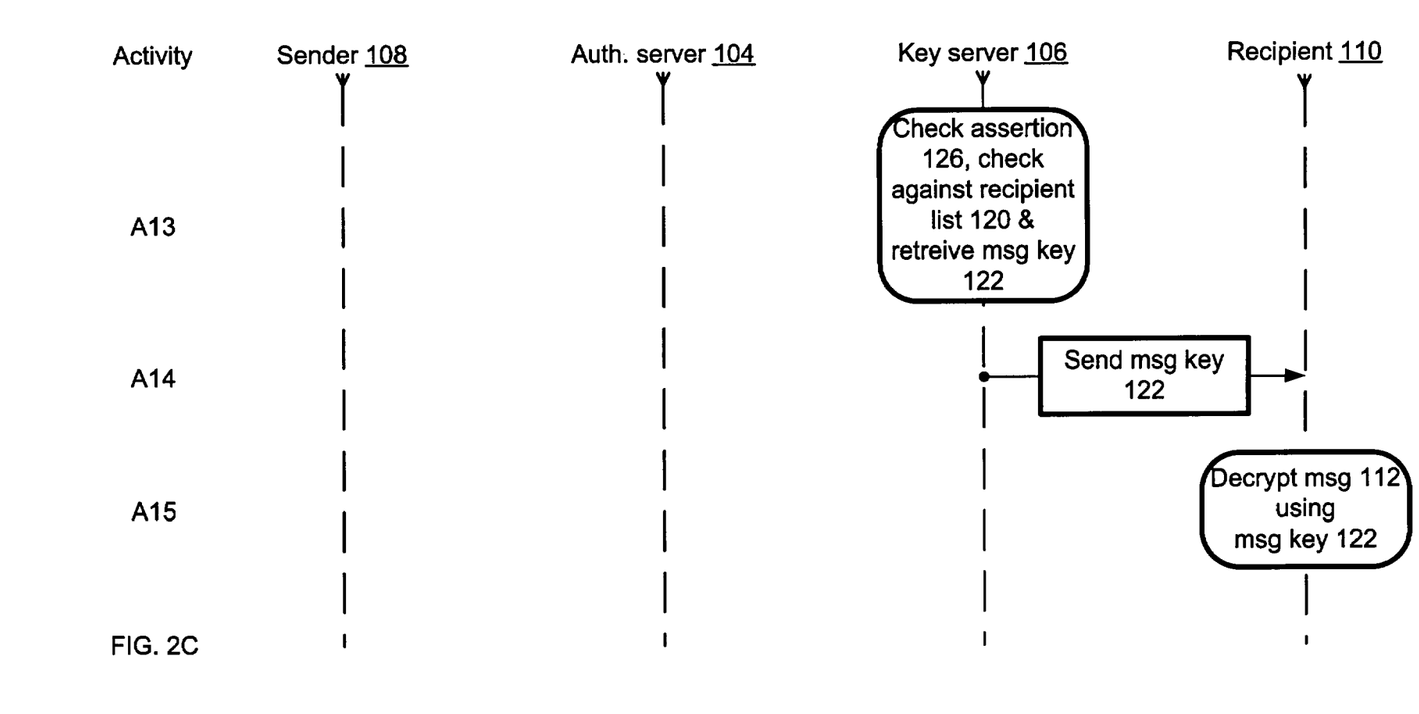

FIGS. 2A-C (background art)(with parts A through C extending across three sheets) is a network data flow diagram of an example message encryption, sending, and decryption that occurs within the secure communication system 100. Each of FIGS. 1 and 2A-C show the process activities associated with the major components of the secure communication system 100 for encryption and decryption of an example message 112. These process activities are as follows.

A1: The sender 108 authenticates by sending an authentication request 114 to an authentication server 104.

A2: The authentication server 104 authenticates the sender 108 via whatever method is appropriate. Various methods can be supported, and multiple ones can be supported concurrently. Which particular method is used, however, is not particularly germane here. Upon successful authentication, the authentication server 104: creates a digitally signed sender assertion 116, vouching for the identity of the sender 108.

A3: Subject to successful authentication, the authentication server 104 sends the sender assertion 116 to the sender 108.

A4: The sender 108 sends a sender key request 118 to the key server 106. The sender key request 118 includes the sender assertion 116 and a recipient list 120 of authorized recipients 110 of the message 112, and formally requests a message key 122.

A5: The key server 106 validates the sender assertion 116, creates the message key 122, and stores the message key 122 along with the recipient list 120 in an internal database.

A6: The key server 106 sends the message key 122 to the sender 108.

A7: The sender 108 encrypts the message 112 using the message key 122.

A8: The sender 108 sends the encrypted message 112 to the recipients 110. There may be many intermediary relays (not shown in the figures) between the sender 108 and each recipient 110. These intermediaries simply relay the message 112 but are not privy to the message key 122, unless a particular intermediary also happens to be a recipient 110 of the message 112.

A9: The recipient 110 sends an authentication request 124 to an authentication server 104. The authentication server 104 with which a recipient 110 authenticates may be, but need not be, the same as the authentication server 104 with which the sender 108 authenticates. The authentication request 124 here can be substantially the same as an authentication request 114 that a sender 108 authenticates with, but that is not a requirement and different criteria may apply.

A10: The authentication server 104 authenticates the recipient 110 via whatever method is appropriate. Again, various methods can be supported. Upon successful authentication, the authentication server 104 creates a digitally signed recipient assertion 126, vouching for the identity of the recipient 110. The recipient assertion 126 here can also be substantially the same as a sender assertion 116 vouching for the identity of the sender 108, but that is also not a requirement.

A11: Subject to successful authentication, the authentication server 104 sends the recipient assertion 126 to the recipient 110.

A12: The recipient 110 sends a recipient key request 128 to the key server 106. The recipient key request 128 includes a resource ID (which uniquely identifies the decryption key) and the recipient assertion 126, and formally requests the message key 122.

A13: The key server 106 validates the recipient assertion 126, checks its internal database to confirm that the recipient 110 is in the recipient list 120, and retrieves the message key 122.

A14: The key server 106 sends the message key 122 to the recipient 110.

A15: The recipient 110 uses the message key 122 to decrypt the message 112.

There must exist an a-priori trust relationship between the authentication server 104 (or authentication servers 104, if more than one is employed) and the key server 106. That is, the key server 106 must trust the authentication server 104 to vouch for the identity of a set of clients 102. Said another way, the key server 106 must verify that the assertions the clients 102 provide to the key server 106 have been created by the authentication server 104 and have not been modified. The key server 106 can implement this trust relationship by acquiring a public verification key of the authentication server 104 (e.g., a X.509 certificate of the authentication server 104, bearing its public key). The authentication server 104 can then use its corresponding private key to sign the assertions 116, 126.

The secure communication system 100 shown in FIG. 1 requires that the sender 108 and all of the recipients 110 be on-line to receive the message key 122, though it is not required that the sender 108 and any recipient 110 be on-line at the same time.

Adding Off-Line Decryption

We now describe how the secure communication system 100 just described can be extended to also provide an off-line decryption capability whereby, subsequent to receipt of an encrypted message, a recipient need not communicate with any other component in order to decrypt the message. Suitable embodiments of the invention can also provide on-line decryption capability when off-line decryption is not possible (e.g., when a recipient has forgotten his or her password). And suitable embodiments can enable a sending organization to implement a policy that satisfies on-line and off-line decryption requirements on a per-recipient basis.

Off-line decryption relies on an encryptor having access to each recipient's verifier. A verifier is analogous to a public key. However, instead of a having a random public/private key pair, a verifier is created based on a known secret (typically, a password). Verifiers are known in the art; see for example, the Secure Remote Password (SRP) proposed by THOMAS WU in IETF RFC 2945, "The SRP Authentication And Key Exchange System". A party who knows a verifier can challenge a party who claims to know the corresponding secret. However, the secret need not be divulged to the challenging party. Nor is it feasible for any party that knows the verifier to guess the corresponding secret.

Figure 3:
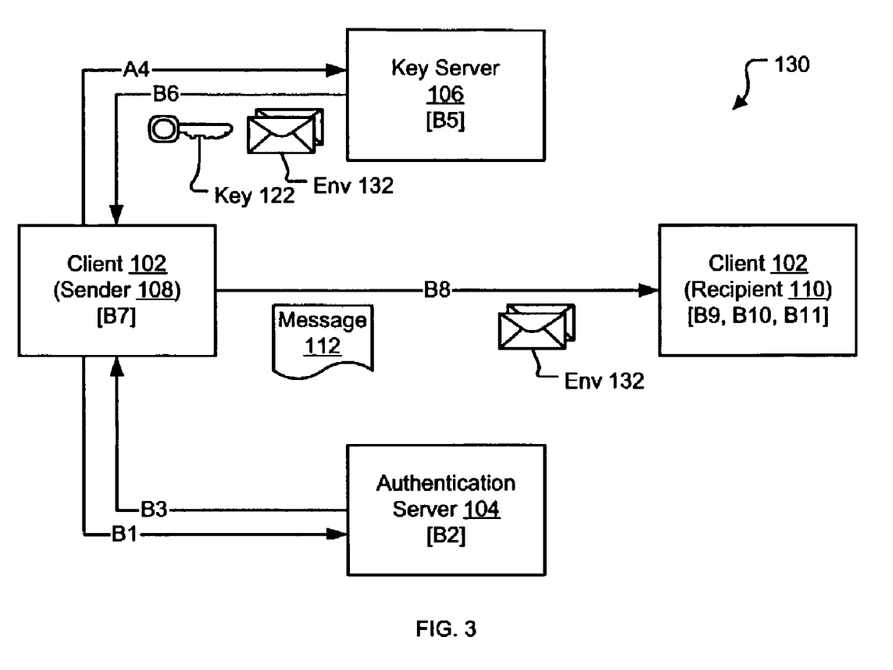
FIG. 3 is a functional block diagram of an online/off-line secure communication system according to the present invention.

FIG. 3 is a functional block diagram of a secure communication system 130 according to the present invention. The secure communication system 130 consists of three major components: clients 102, an authentication server 104, and a key server 106. The clients 102 are again conceptually viewed as one component because the senders 108 and recipients 110 collectively are both "clients" of the authentication server 104 and the key server 106. The authentication server 104 may be the same as in the secure communication system 100 of FIGS. 1 and 2A-C (background art). The key server 106 now has additional capabilities, however. And, as discussed presently, a key server 106 may also be used in embodiments of the invention that operate in the manner of the secure communication system 100 and alternately in the manner of the secure communication system 130. Also, as was the case for the secure communication system 100, all interactions between a client 102 (that is, either a sender 108 or a recipient 110 and either the authentication server 104 or the key server 106 may be encrypted using short-lived session keys.

Figure 4A:
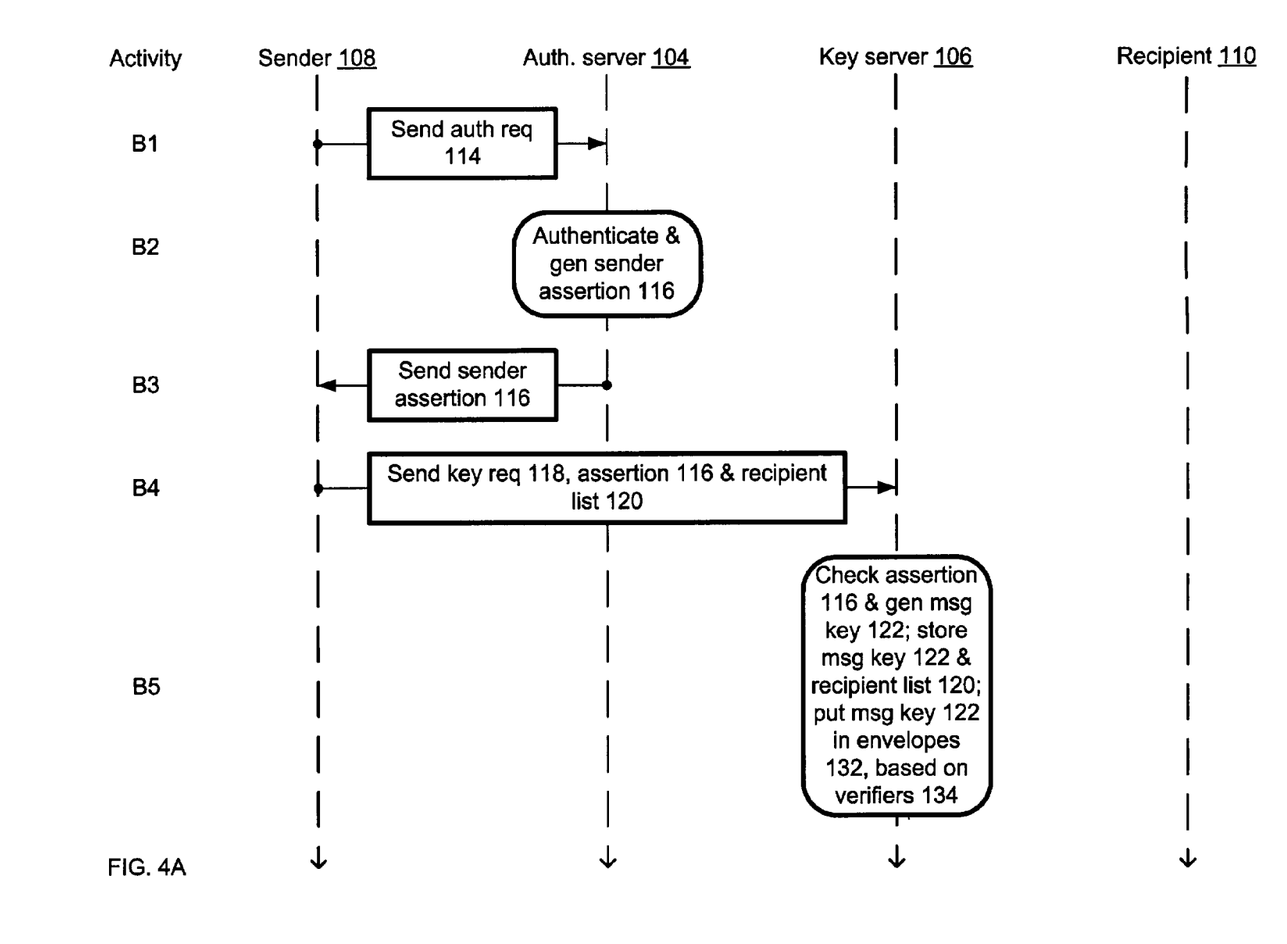
FIGS. 4A-B (extending across two sheets) is a network data flow diagram of an example message encryption, sending and decryption process that occurs within the improved secure communication system of FIG. 3.
Figure 4B:
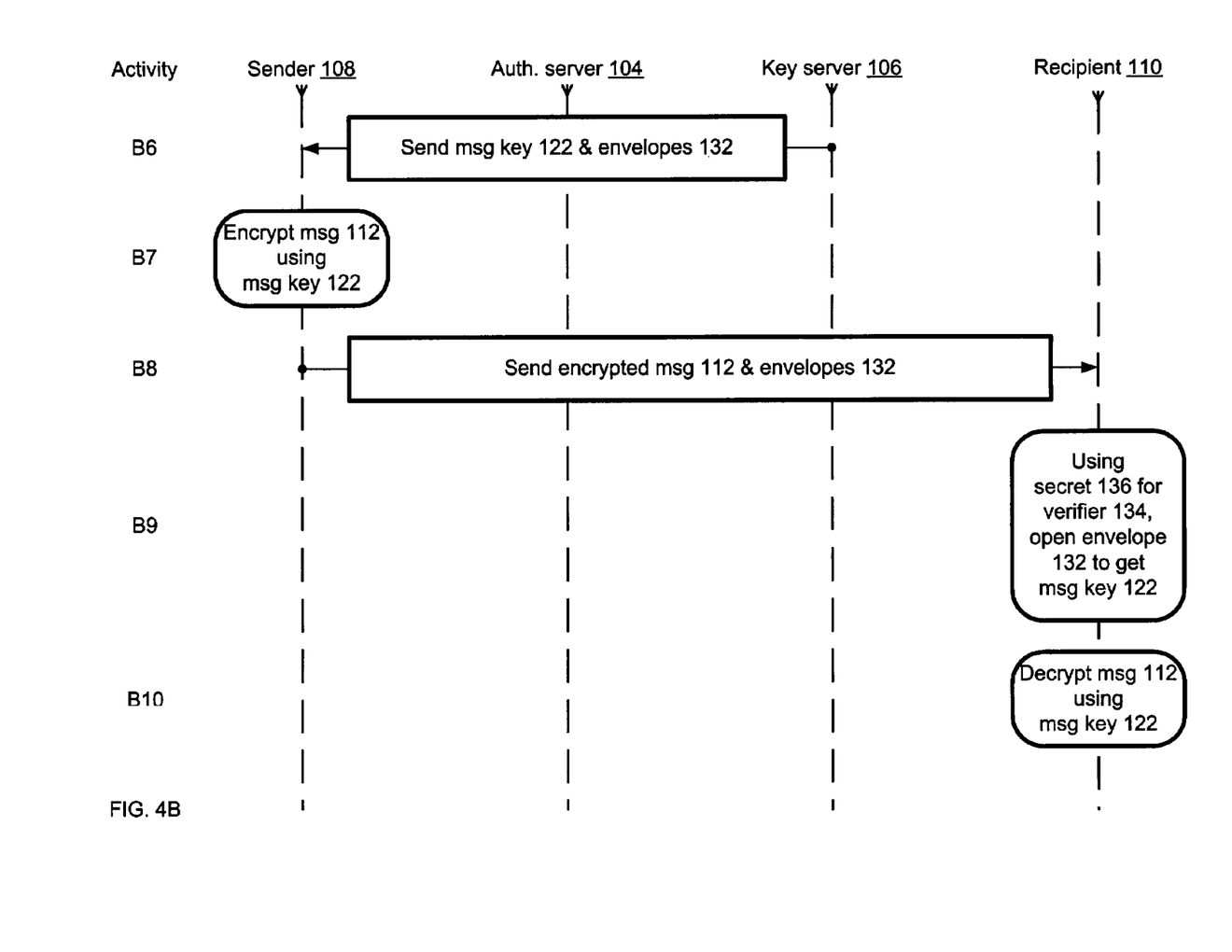

FIGS. 4A-B (in parts A and B extending across two sheets) is a network data flow diagram of an example message encryption, sending and decryption process that occurs within the secure communication system 130. Each of FIGS. 3 and 4A-B show the process activities associated with the major components of the secure communication system 130 for encryption and decryption of an example message 112. These process activities are as follows.

B1: The sender 108 authenticates by sending an authentication request 114 to an authentication server 104

B2: The authentication server 104 authenticates the sender 108 via whatever method is appropriate (various and multiple methods can be supported for this). Upon successful authentication, the authentication server 104 creates a digitally signed sender assertion 116, vouching for the identity of the sender 108.

B3: Subject to successful authentication, the authentication server 104 sends the sender assertion 116 to the sender 108.

B4: The sender 108 sends a sender key request 118 to the key server 106. The sender key request 118 includes the sender assertion 116 and a recipient list 120 of authorized recipients 110 of the message 112, and formally requests a message key 122.

Activities B1 through B4 may be essentially the same as activities A1 through A4, described with respect to FIGS. 1 and 2A-C.

B5: The key server 106 validates the sender assertion 116, creates the message key 122, and places the message key 122 in an envelope 132. Each message 112 may have one or more message keys 122. For instance, multiple message keys 122 might be used when a message 112 has multiple parts like a body and one or more attachments. Each message key 122 may also be put in multiple envelopes 132, usually one per recipient 110. A single envelope 132 might also be used for multiple recipients 110, but that is generally not desirable because each recipient 110 would then have to know the corresponding secret(s) that opens the envelope 132. Additionally, in a typically used option that is discussed further presently, the key server 106 can also store the message key 122 along with the recipient list 120 in an internal database.

B6: The key server 106 sends the message key 122 and all of the envelopes 132 (each containing an encrypted copy of the message key 122) to the sender 108.

B7: The sender 108 encrypts the message 112 with the message key 122.

B8: The sender 108 sends the encrypted message 112 along with the envelopes 132 to the recipients 110. All of the recipients 110 can be sent all the envelopes 132 (which are generally small), or traffic can be reduced by providing each recipient 110 with only the envelope 132 it will need. There may be many intermediary relays between the sender 108 and the recipient 110 (not shown in the figures). The intermediaries simply relay the message 112 but are not privy to the message key 122 or the contents of any envelope 132, unless an intermediary also happens to be an authorized recipient 110 of the message 112.

Activities B5 through B8 are modified from activities A5 through A8, described with respect to FIGS. 1 and 2A-C.

B9: The recipient 110 uses the secret 136, corresponding with the verifier 134, to open (decrypt) the appropriate envelope 132 to obtain the message key 122.

B10: The recipient 110 uses the message key 122 to decrypt the message 112.

Activity B9 replaces activities A9 through A14 and activity B10 may be essentially the same as activity A15, as described with respect to FIGS. 1 and 2A-C.

Creating the Verifier

The secure communication system 130 just described uses the verifier 134 to create the encrypted envelopes 132, which contain the message key 122. There are multiple methods by which the key server 106 can know the verifier 134 for each recipient 110, five of which are described below. Also, each envelope 132 could use a different method; that is, enveloping for all recipients 110 need not use the same method.

First, the key server 106 may ask the authentication server 104 for a verifier 134 for each recipient 110. In this case, one or more of the following may apply. The authentication server 104 may already have the verifier 134; the authentication server 104 may have the secret 136 of the recipient 110, and thus be able to create the verifier 134 on the fly; or the authentication server 104 may have data that is equivalent to the secret 136 (e.g., a hash of the secret 136), and can create the verifier 134 on the fly from this.

Second, the key server 106 may create the verifier 134 on the fly by asking the authentication server 104 for the secret 136 of the recipient 110, or for data that is equivalent to it (e.g., a hash of it). Third, the sender 108 can provide the verifier 134 of a recipient 110 to the key server 106, based on a-priori knowledge of the verifier 134. Fourth, the sender 108 can create the verifier 134 of a recipient 110 on the fly and provides it to the key server 106. And fifth, the key server 106 can create the verifier 134 on the fly, based on the secret 136 which the sender 108 provides.

The sophisticated variations of the secure communication system 130 described above use the key server 106, but even this is not a requirement. The sender 108 can have or create the verifier 134, and then use it itself to create the envelope 132. The sender 108 can do this using a message key 122 obtained from a key server 106, with or without involvement of an authentication server 104, or the sender 108 can have or create the message key 122.

The Enveloping Algorithm

There are various possible methods for creating the envelope 132 containing the message key 122, two of which are now discussed. First, the verifier 134 can be used to create an envelope key. One suitable technique for this is to derive the envelop key via the publicly-known Diffie-Hellman key agreement. For example, the creator of the envelope key may use the verifier 134 to arrive at, say, some 2,000 bits of data, wherein the recipient 110 will be able to arrive at those same 2,000 bits of data by using the secret 136. Then, a conventional encryption algorithm (e.g., AES) can be used to encrypt the message key 122 with the envelop key, thereby creating the envelope 132. This requires the creator of the envelope 132 to include how the envelop key was derived and what algorithm was used to encrypt the message key 122. Continuing with our example, since only, say, 128 bits are needed by the encryption algorithm, some accord or advisement is needed whereby the recipient 110 will know which 128 bits out of the available 2,000 bits the envelope key creator used and, furthermore, which encryption algorithm was used.

Second, the verifier 134 can be more directly used to create the envelope 132 itself. That is, an encryption key for the envelope 132 can be based on the verifier 134 and a corresponding decryption key for the envelope 132 can be based on the secret 136 corresponding to the verifier 134 This method has the advantage that the creator of the envelope 132 need not specify how the encryption key for the envelope 132 was derived. One example technique suitable for this is to encrypt the message key 122 via the publicly-known El-Gamal encryption algorithm.

Some Alternative Embodiments

We now consider various alternative embodiments of the invention, some of which include a combination of aspects of the secure communication systems 100, 130 described above, and others of which build upon respective aspects of the secure communication systems 100, 130.

On-line key retrieval, e.g., in the manner of the secure communication system 100, and off-line decryption, e.g., in the manner of the secure communication system 130, are not mutually exclusive. On-line key retrieval can be used as a fallback mechanism. As noted when discussing activity B5, above, the key server 106 can store the message key 122 in its database. In the case that a recipient 110 cannot open the envelope 132, say, because the recipient 110 has forgotten the secret 136 corresponding to the verifier 134 that was used to create the envelope 132, the recipient 110 can be given the option to communicate with the key server 106 and request the message key 122.

The sender 108 can communicate a key retrieval policy to the key server 106 to indicate exactly how each recipient 110 can retrieve the message key 122. For example, a sender 108 can specify a set of recipients 110 that must get the message key 122 by retrieving it from the key server 106 (i.e., be on-line and request the message key 122 from the key server 106), and the sender 108 can also specify a set of recipients 110 that can be off-line. The key server 106 creates and stores the message key 122. Additionally, the key server 106 can create the envelopes 132 for only the set of recipients 110 who are authorized to decrypt the message 112 off-line. Similarly, any authorized party (e.g., the key server 106 itself, an administration client of the key server 106, etc.) can set the key retrieval policy.

In cases where the key server 106 does not have access to the verifiers 134 of recipients 110, the sender 108 can create the envelopes 132 and include them in the message 112. Note that in such a case, the key server 106 operates in the manner of the secure communication system 100, i.e., in an on-line mode. It is then the sender 108 that, upon receiving the message key 122, creates the envelopes 132 and includes them when sending the message 112.

There may also be a desire to eliminate the key server 106 all together, or to simply not use it. This is particularly advantageous in the case of peer-to-peer communication, consisting of small sets of senders 108 and recipients 110. In such embodiments of the invention, the sender 108 creates the message key 122 and the envelopes 132. There is no on-line key retrieval capability if no key server 106 exists, or when a key server 106 does exist but has not been employed and does not have the message key 122.

In a typical embodiment, the invention may employ the authentication server 104 as the custodian of the verifiers 134, since it can easily create and store the verifiers 134 for its existing users (i.e., potential recipients 110. To make this easy and transparent, it can be done whenever the authentication server 104 solicits a user's private credentials for any reason, including ones that have nothing to do with creating assertions 116, 126 for accessing the key server 106. Typically a password is the credential or "secret" that is used. Furthermore, once the authentication server 104 has created and stored a verifier 134, it can update it whenever a user changes their private credentials. This has two benefits. First, it makes creation of the verifier 134 transparent (though, users could be given notice of such an action if their agreement is required). Second, the verifier 134 can be updated transparently when a user changes their secret 136.

A verifier 134 is typically constructed from a secret 136 that is a password. However, this need not be the case. A verifier 134 can also be constructed from any number of attributes of the recipient 110, either public or private. For example, a verifier 134 could be constructed based on a Social Security number, mother's maiden name, state of residence, etc. The strength of the verifier 134 is proportional to the number and secretive strengths of the attributes that go into its construction.

As mentioned previously, in some embodiments of the invention, the authentication server 104 may be the custodian of the verifiers 134 However, because verifiers 134 are generally public data, they need not be stored in a trusted repository. Thus, yet other embodiments of the invention can use a verifier repository that is separate from the authentication server 104

An important limitation of an off-line decryption system is that off-line decryption is not possible if a recipient 110 forgets his or her secret 136. Moreover, if the recipient 110 changes the secret 136, all messages 112 enveloped using the old secret 136 cannot be opened using the new secret 136. As a result, the recipient 110 must remember multiple secrets 136 (e.g., multiple passwords).

Some embodiments of the invention overcome these limitations using the following method. When a recipient 110 has changed the secret 136 he must go on-line to retrieve the message key 122. Once on-line, the key server 106 can create a new envelope 132 (based on the current verifier 134 for the current secret 136 of the recipient 110 and send that envelope 132 to the recipient 110. This allows for a reasonably seamless roll-over of secrets 136 of the recipient 110. However, a limitation of this is that the recipient 110 must be on-line once for every message 112 having a verifier 134 that no longer matches the current secret 136. The key server 106 could send multiple envelopes 132 using the new verifier 134. For example, if a user has 100 messages 112 where the message keys 122 were enveloped using an old verifier 134, once on-line, the recipient 110 can get the new envelopes 132 from the key server 106 for all 100 of the previous message keys 122 (or, even one envelope 132 containing the 100 message keys 122).

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present secure communication system 130 is well suited for application in electronic communications of e-mail, other message types, files, and other information, concurrently providing both high security and high ease of use for both on-line and off-line decryption.

Unlike the majority of prior art schemes, the present invention permits off-line decryption by message recipients. Alternately, the present invention can also permit on-line decryption, establishing this as a requirement for some of multiple recipients or providing it as a fall back, for instance, when a recipient forgets their password.

Further, unlike prior art off-line decryption schemes that use enveloping where a message key is encrypted based on an envelope key derived directly from a password, and the notorious attendant susceptibility of such to various types of attacks on the password, the present invention uses encryption based on a verifier that corresponds with a secret of the message recipient. Such verifiers may be made considerably more substantial than passwords, yet the corresponding secrets can be passwords, and thus can be easily remembered and used by the recipients.

Furthermore, unlike other prior art off-line decryption schemes that use complex arrangements like public key infrastructure (PKI) wherein large public keys must be ascertained, procured, stored, and available whenever and wherever one wishes to send or read a secured message, the present invention again uses the verifier/secret based approach where both the verifier and the secret are easily used by the respective parties employing them. While a verifier is analogous to a public key, it is far less odious to use. Similarly, a secret is (remotely) analogous to a private key, and far less odious to use. Since a secret can be a password, or based on some other public or private attribute of the recipient, it is quite easy for recipients to remember and work with secrets.

Nonetheless, while providing the noted and other advantages, the present invention may now be implemented by those of reasonable skill in the art, creating embodiments using existing technologies if desired, and then used by individuals and organizations with ordinary skills and aptitudes.

For the above, and other, reasons, it is expected that the secure communication system 130 of the present invention will have widespread industrial applicability. Therefore, it is expected that the commercial utility of the present invention will be extensive and long lasting.

The invention claimed is:

1. A method for secure communication of a message from a sender to a recipient, the method comprising the steps of:
   in a first computerized system, creating an envelope containing a message key by encrypting said message key based on a verifier that is based on a secret of the recipient;
   providing said message key to the sender;
   at the sender, in a second computerized system, encrypting the message based on said message key;
   sending the message from the sender to the recipient;
   providing said envelope to the recipient; and
   at the recipient, in a third computerized system:
      opening the envelope based on said secret of the recipient;
      retrieving said message key from the envelope; and
      decrypting the message based on said message key.

2. A method for a sender to encrypt a message intended for a recipient, the method comprising the steps of:
   (a) providing a message key;
   (b) in a first computerized system, creating an envelope containing said message key by encrypting said message key based on a verifier that is based on a secret of the recipient; and
   (c) in a second computerized system, encrypting the message based on said message key, thereby permitting the message to be sent securely with said envelope from the sender to the recipient, and the recipient to be provided said envelope so that said secret can be used to open said envelope to retrieve said message key and decrypt the message.

3. The method of claim 2, wherein said step (a) includes generating said message key at the sender itself.

4. The method of claim 2, wherein said step (a) includes:
   obtaining said message key at a key server; and
   the sender receiving said message key from said key server.

5. The method of claim 4, wherein said key server stores a copy of said message key.

6. The method of claim 5, wherein said step (a) includes instructing said key server whether and under what conditions said message key may be released to parties other than the sender itself.

7. The method of claim 5, wherein said step (a) includes:
   the sender providing a recipient list to said key server; and
   said key server storing a copy of said recipient list.

8. The method of claim 4, wherein said step (a) includes authenticating the sender as a condition of said key server providing said message key.

9. The method of claim 8, wherein said step (a) includes the sender submitting a sender assertion to the key server, wherein said sender assertion originates from an authentication server.

10. The method of claim 2, wherein said step (b) includes:
    deriving said envelope key based on a key agreement protocol; and
    encrypting said message key using a symmetric encryption algorithm.

11. The method of claim 10, wherein:
    said key agreement protocol is the Diffie-Hellman key agreement; and
    said encryption algorithm is the AES encryption algorithm.

12. The method of claim 2, wherein said step (b) includes encrypting said envelope key directly with said verifier, thereby permitting decrypting said envelope directly with said secret.

13. The method of claim 12, wherein said step (b) includes encrypting said message key based on a public key encryption algorithm.

14. The method of claim 13, wherein said public key encryption algorithm is the El-Gamal encryption algorithm.

15. The method of claim 2, wherein said step (b) includes generating said envelope at the sender itself.

16. The method of claim 2, wherein said step (b) includes:
    generating said envelope at a key server; and
    the sender receiving said envelope from said key server.

17. The method of claim 16, wherein:
    the recipient is one of a plurality of recipients of the message; and
    said step (b) includes the sender instructing said key server which of said plurality of recipients said key server is to create said envelopes for, thereby implementing a policy that at least some of said plurality of recipients must go on-line to get said message key while others may read the message off-line.

18. The method of claim 16, wherein said step (b) includes said sender providing either said verifier or said secret to said key server, thereby permitting said key server to create said verifier.

19. The method of claim 18, wherein said step (b) includes said sender creating and providing said verifier to said key server.

20. The method of claim 16, wherein said step (b) includes said key server asking an authentication server for either said verifier or said secret, thereby permitting said key server to create said verifier.

21. The method of claim 20, wherein said authentication server employs a member of the set consisting of already having said verifier, having said secret and creating said verifier, having data equivalent to said secret and creating said verifier, and having a hash of said secret and creating said verifier.

22. The method of claim 2, wherein said secret is a password.

23. The method of claim 2, wherein said secret is based on at least one public or private attribute of the recipient other than a password.

24. The method of claim 2, wherein the verifier is a recipient verifier and the sender includes a sender verifier with the message, thereby permitting the recipient to easily reply to the message in a secure manner.

25. The method of claim 24, wherein said sender verifier is included in said envelope.

26. A system for a sender to encrypt a message intended for a recipient, comprising:
    a first computerized system able to create an envelope containing a message key by encrypting said message key based on a verifier that is based on a secret of the recipient;
    said first computerized system further able to provide at least said envelope to a second computerized system, wherein second computerized system is employed by the sender; and said second computerized system able to encrypt the message based on said message key, thereby permitting the message to be sent securely from the sender to the recipient and the recipient to be provided said envelope so that said secret can be used to open said envelope to retrieve said message key and decrypt the message.

27. The system of claim 26, wherein said first computerized system and said second computerized system are the same.

28. The system of claim 26, wherein:

said first computerized system is a key server; and said second computerized system receives said message key from said key server.

29. The system of claim 28, wherein said key server has a database in which it stores a copy of said message key.

30. The system of claim 29, wherein:

said second computerized system provides a recipient list to said key server; and said key server also stores a copy of said recipient list in said database.

31. The system of claim 28, further comprising an authentication server, and wherein said second computerized system authenticates the sender to said key server based on an assertion issued by said authentication server, as a condition for said key server providing said message key to said second computerized system.

32. The system of claim 28, further comprising an authentication server, and wherein said key server asks said authentication server for either said verifier or said secret, thereby permitting said key server to create said verifier.

* * * * *